Figures 1, 11, 12:
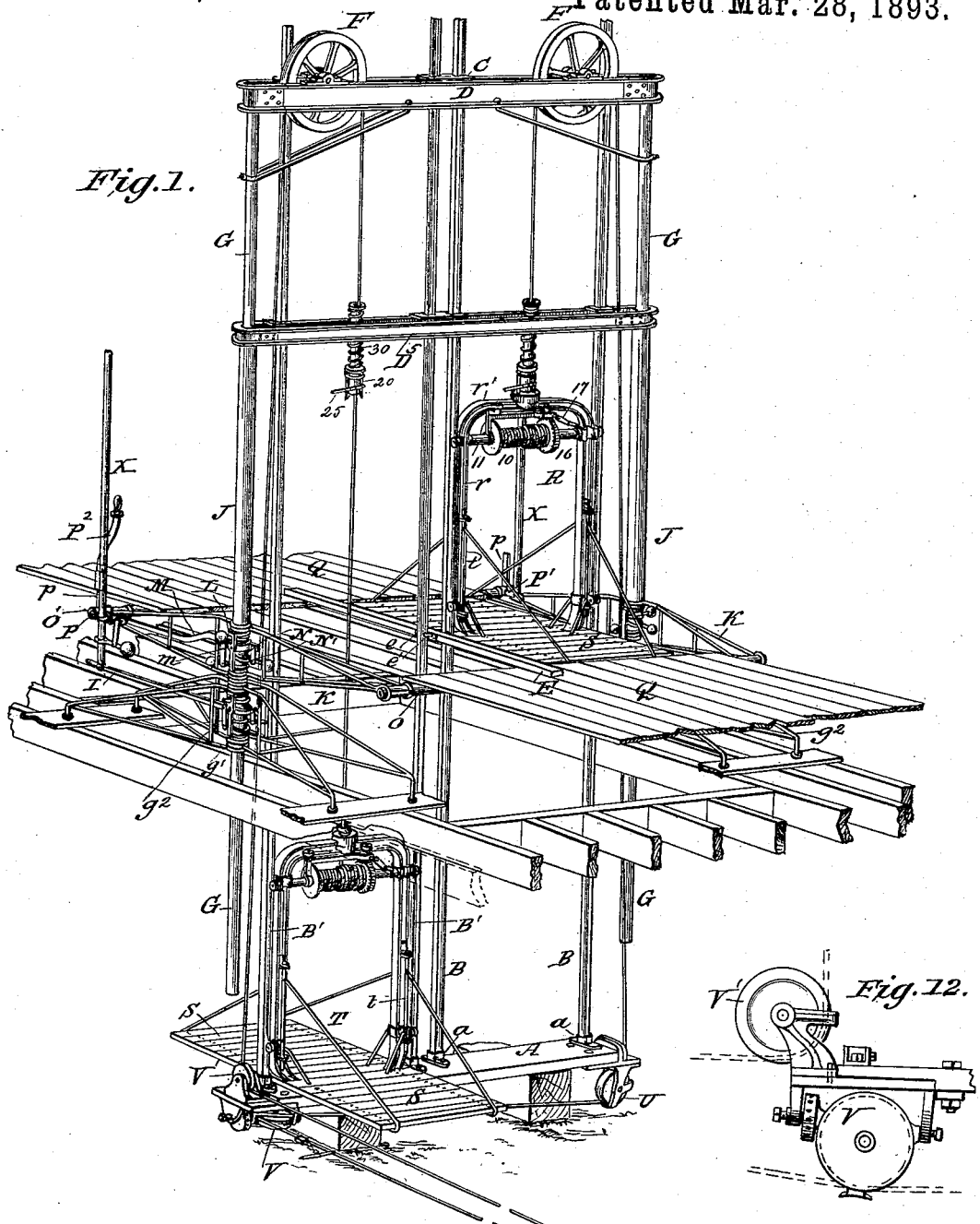

(No Model.)
4 Sheets—Sheet 1.

J. E. ENNIS.
HOISTING MACHINE.

No. 494,328. Patented Mar. 28, 1893.

WITNESSES:
Fred G. Dieterich
M. D. Blondel

INVENTOR:
John E. Ennis.
BY
ATTORNEYS

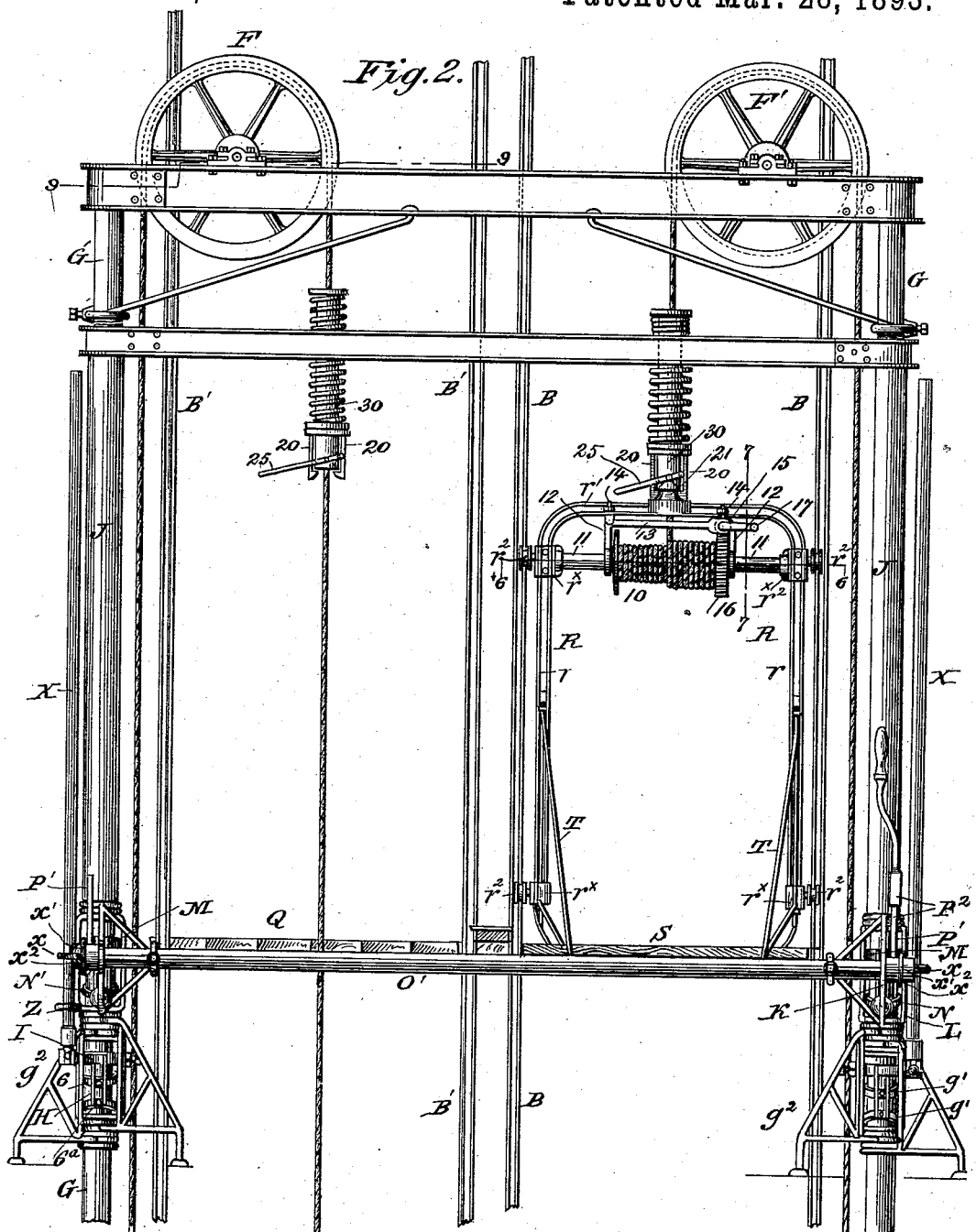

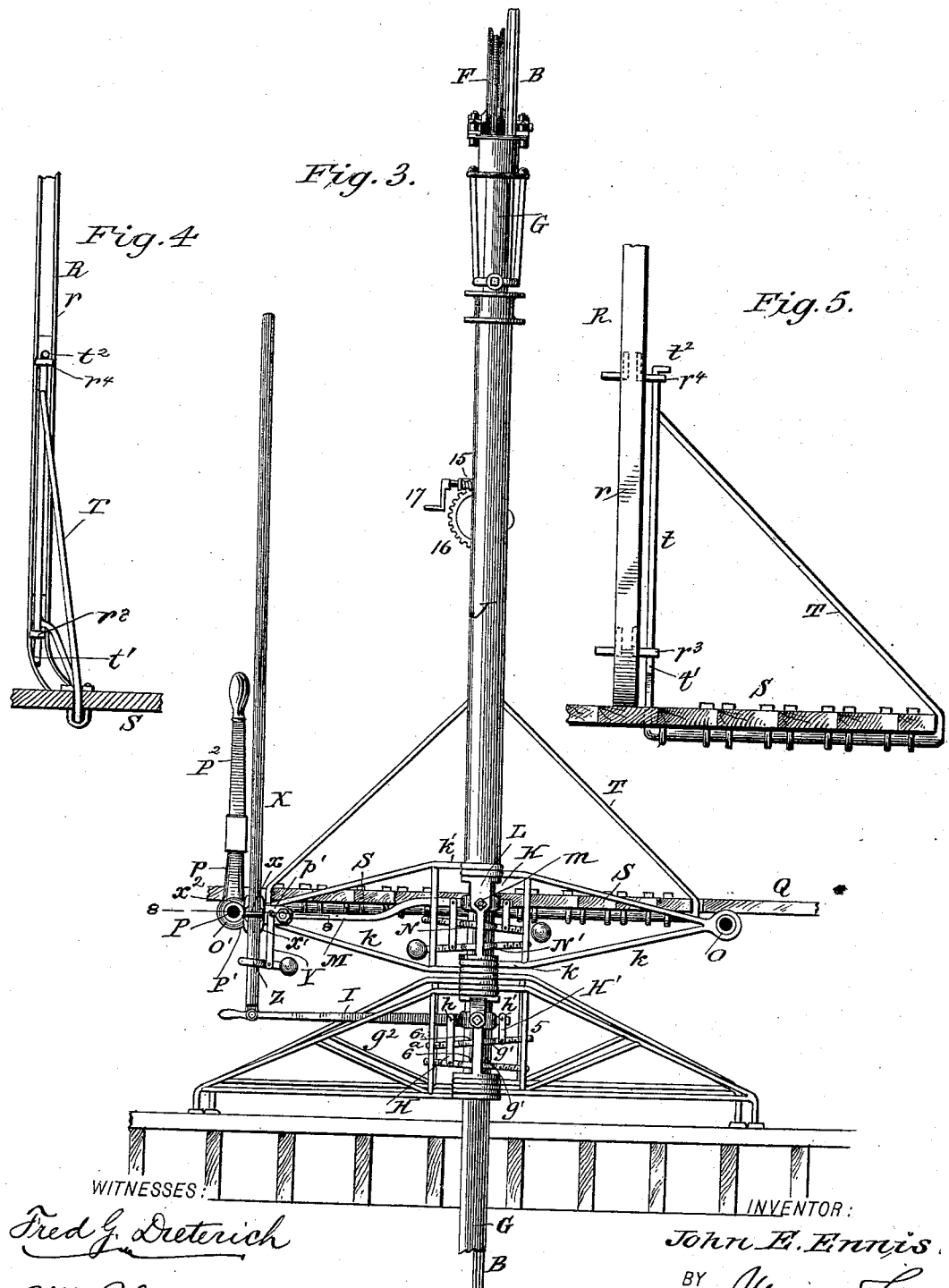

(No Model.) 4 Sheets—Sheet 4.
J. E. ENNIS.
HOISTING MACHINE.
No. 494,328. Patented Mar. 28, 1893.
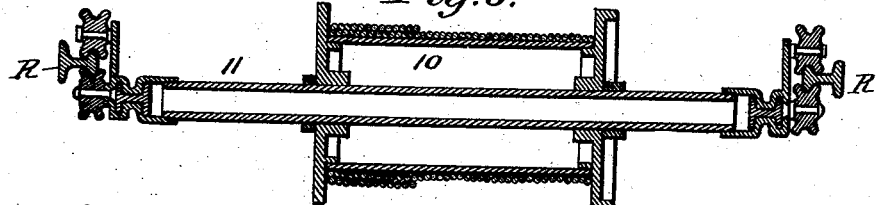
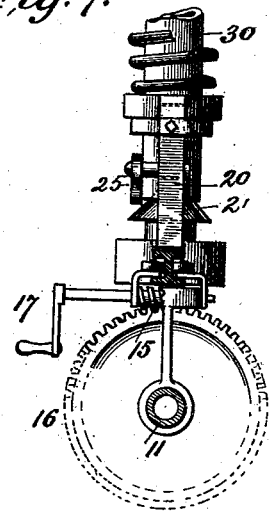
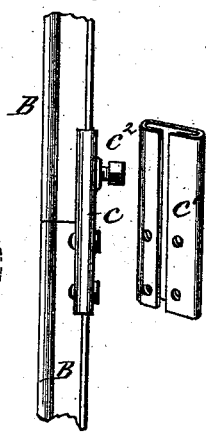
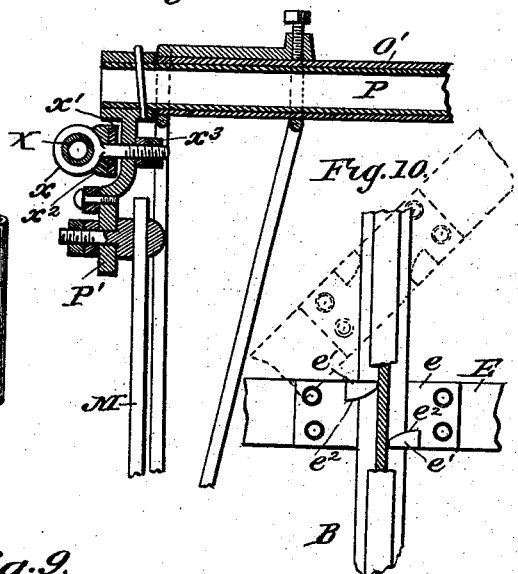
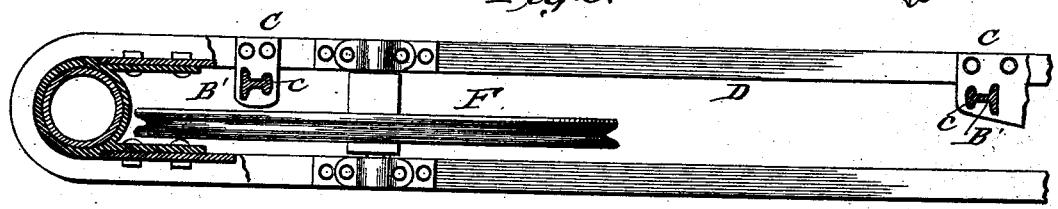
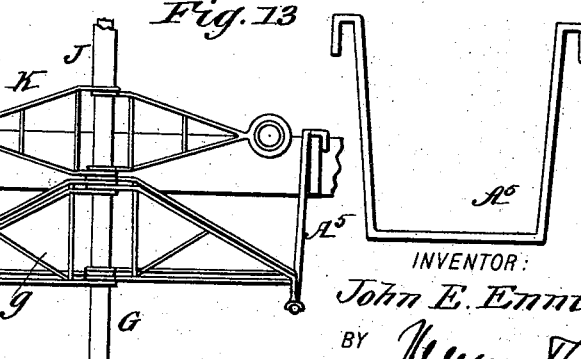
WITNESSES:
Fred G. Dieterich
M. D. Blondel
INVENTOR:
John E. Ennis
BY
ATTORNEYS

United States Patent Office.

JOHN E. ENNIS, OF DULUTH, MINNESOTA.

HOISTING-MACHINE.

SPECIFICATION forming part of Letters Patent No. 494,328, dated March 28, 1893.

Application filed October 31, 1891. Renewed August 26, 1892. Serial No. 444,171. (No model.)

*To all whom it may concern:*

Be it known that I, JOHN E. ENNIS, residing at Duluth, in the county of St. Louis and State of Minnesota, have invented certain new and useful Improvements in Hoisting-Machines, of which the following is a specification.

My invention relates to hoisting machines more especially adapted for use in elevating bricks, mortar, stone and other material to the workmen in erecting buildings, it being however manifest that it may be used for many other purposes.

My invention has for its object to provide an apparatus of this character which will be simple in the construction, and which can be operated to bring the hoist cage floor always in the same horizontal plane with the workmen's platform.

It also has for its object to provide an apparatus which can be used as soon as the first workman's platform is required.

It has also for its object to provide means whereby the platform adjusting devices and the elevating supporting sheaves can be simultaneously elevated to variable degrees of height by a single operating lever.

To these ends my invention consists in the peculiar combination and novel arrangement of parts all of which will hereinafter be described in the specification and then specifically pointed out in the claims reference being had to the accompanying drawings in which Figure 1. is a perspective view of my improved hoisting apparatus. Fig. 2. is a front view of the cage supporting frames and frame elevating mechanism. Fig. 3. is a side view of the same. Figs. 4. and 5. are detail views of the detachable cage platform sections hereinafter specifically referred to. Fig. 6. is a horizontal section taken on the line 6—6 Fig. 2. Fig. 7. is a detail section on the line 7—7 Fig. 2. Fig. 8. is a horizontal section taken on the line 8—8 Fig. 3. Fig. 9. is a horizontal section on the line 9—9 Fig. 2. Fig. 10. is a detail view of one of the track rail braces and Figs. 11, and 12 are detail views of the adjustable guide pulleys hereinafter referred to. Fig. 13 is a detail view illustrating the stirrup support hereinafter referred to. Fig. 14. is a detail view of one of the rail joints.

Referring to the accompanying drawings A, indicates a base frame, supported above the ground in the manner shown in Fig. 1, which base forms the lower support for the cage guide rails B, B, B', B', the lower ends fitting socket plates $a, a$, secured to the frame A, while their upper ends are held in plates C, C, secured to the elevator sheave supporting cross head D, such plates C, C, having apertures $c$ of a shape to fit the rails B, as clearly shown in Fig. 9, of the drawings.

In the practical arrangement of my improved apparatus, the rails B, B' are extended from floor to floor as fast as the different stories are built, such extensions being secured together in the manner most clearly shown in Fig. 14. of the drawings and which consists in providing one end of one rail section with a clamp like extension $c'$, which fits over and clamps the adjacent rail section and is held thereto by means of a set screw $c^2$ as shown. Additional braces are provided for each rail as fast as new floor joists are set, such braces consisting of cross bars E, provided with a plate $e$, having clamp members $e'$ formed with opposite inclined and beveled portions $e^2$ as most clearly shown in Fig. 10. By this arrangement of a brace bar I am enabled to slip the clamp members $e'$ over the flanges $b, b$, of the rails when held diagonally thereto (owing to the beveled arrangement of the clamp) and to clamp over such flanges when swung to a horizontal position in which position the several brace bars can be nailed to the joists.

The elevating supporting sheaves F, F' are journaled in the cross head D, between the parallel members thereof as clearly shown in Fig. 9, and such cross head is supported on the upper end of the shafts G G which are supported at their lower ends in clutch members $g'$ $g'$ pivotally supported in the frame or standard $g^2$, such clutch members $g'$ $g'$ and frame $g^2$ being of a special construction, which forms the subject matter of a separate application filed by me October 19, 1891, Serial No. 409,212, and the construction of which in general consists in forming the said clutch members with threaded extensions 5, and arranging their biting or grip collars 6 diagonally to the standard or shafts G, the lower one $6^a$ of such collars being inclined downward while the upper is inclined upward for a purpose presently explained.

H— H' indicate the pivoted links, one set of which H, connects the lower collar $6^a$ with a lever I while the other set H' connects the upper collar 6 with the outer end of the lever, which is journaled at a point between the link connections $h\ h'$ to a yoke frame J which encircles the shafts G and is held from vertical movement by the frame or supports $g^2$. By this arrangement when the handle member of the lever I is reciprocated vertically, the clutch collars will alternately grip the shaft and lift it as they are lifted and then slide freely thereon as they are depressed, such collars however are so arranged that as one is free to move on the shafts the other has a tight bite or grip thereon and holds the shaft to its elevated position.

Upon each of the shafts G is mounted a sleeve J the lower ends of which are supported on sliding frames K formed of a number of sections $k$, the inner ends of which are formed into horizontal apertured members $k'$ $k'$ which fit to slide on the shafts G G. Between the members $k\ k$ are mounted to embrace the said shafts G yoke members L in which is pivoted an operating lever M which is connected with clutch collars N N' arranged and constructed in a manner similar to the collar 6 and $6^a$ with the exception that they are held to operate reversely i. e. they alternately serve to make the fulcrum on which the lever M is swung thereby making the central or bearing point $m$ of the lever its lifting point, whereby at each movement of the lever the frame K will be elevated.

The outer ends of the frames K are connected with each other by the tubular shafts O O' and in one of such shafts (O') is held a rock shaft P upon the outer ends of which are secured the operating levers P' the construction of which is most clearly shown in Figs. 2 and 8, by reference to which it will be seen they are formed of the angular members the vertical portions $p$ of which are adapted to receive the handles $P^2$ while the horizontal members $p'$ are connected to outer ends of levers M. By this construction it will be observed that by operating either of the levers the shaft P will be rocked and both of the levers will be operated, which in turn operate the levers M and thereby raise the frames K on the shafts G and with them the sleeves J.

It should be stated that the frames K are of a length greater than the width of the elevator cages the shafts O O serving as supporting bars for the inner ends of the platform sections Q which serve to connect the workmens scaffold platforms with the cage floor for a purpose presently explained.

In the practical arrangement of my improved elevating apparatus, I use it in connection with the peculiar arranged scaffold elevating devices shown in my other application above referred to. It will also be noticed that by this construction the frames K and the platform sections Q can at all times be raised to be in the same horizontal plane with the workmen's scaffold.

R indicates the elevator cages which consist each of the vertical members $r\ r$ and the cross heads $r'$ the end sections having blocks $r^x$ secured thereto in which are journaled rollers $r^2$ which travel on the guide rails B B' as most clearly shown in Fig. 2. The cage platforms are formed each of two detachable sections S S, each of which consists of a number of planks secured to triangular supports T detachably held on the frame members $r$.

To provide for readily detaching the sections S S from the cage frame, I form the vertical rods $t$, of the supports T with downwardly extending members $t'$ which fit in apertured lugs $r^3$ on the members $r$, the upper ends of such rods being held in similar apertured lugs $r^4$, and are formed with hocked portions $t^2$ as shown. By this arrangement the supports T can be raised until their members $t'$ are lifted out of the lugs $r^3$ and can then be quickly detached from the frames R by unhooking the ends $t^2$.

The general arrangement of the entire apparatus is most clearly shown in Fig. 1 of the drawings by reference to which it will be seen that a continuous elevating cable is employed, to the ends of which are secured the elevator cages R such cages being arranged so that as one reaches its elevated position the other will be on the ground to receive a fresh load of material.

In practice if a building say one hundred feet high is to be erected a cable three hundred feet long would be employed, the ends of which would be wound on the drums 10 mounted in the upper ends of the cage frames R while the looped portions are passed over the supporting sheaves F F then down over ground pulleys U V V' secured to the base frame A and then over a stationary pulley or snatch block W located at a point say one hundred feet from the pulleys U V V'.

As before stated one of the essential features of my invention is to provide for adjusting the lift of the cages in such a manner that as the builder's scaffolds are elevated, the cages can always be brought to a stop, in the same plane with such scaffolds without the necessity of readjusting the cables.

As the elevating cables have four depending sections it is only necessary that the elevator supporting cross head have a movement one fourth that of the frames K and the tubular sleeves J to shorten the cable a length equal the lift of the said frames and sleeves. To this end I provide means whereby the frames K and the sleeves J carried thereby and the cross head D and the supporting shafts G can be simultaneously moved to such varied degrees by a single operating lever. To this end I provide suitably arranged intermediate mechanism between the clutch devices which operate to lift the frames K and the clutch devices which operate to lift the shafts G which mechanism is most clearly shown in Figs. 2 and 8 the arrangement and operation of which I will now describe.

Assuming for example that the elevating devices are capable of being raised to a height of eight feet in each story and the elevator cage platform is flush with the top of the joists the elevator support or cross head would be at a point six feet above the cross head $D^5$ which connects the sleeve or standards J. Adjacent the rock shafts O O' at a point near the levers P' vertical rods X are provided the lower ends of which are connected to the outer ends of the levers I which operate the lifting clutches 6 $6^a$. These rods X pass through and have a tight frictional bearing in guide loops or eyes $x$, which are held to their operative positions by means of the flat and cushion springs $x'$ $x^2$ and the tightening nuts $x^3$ as shown, and such loops or eyes $x$ are secured in the horizontal members of the levers P' at a point near their pivots, and to such members at a point between the eyes $x$ and their ends are pivoted the upper ends of links Y the lower ends of which connect with the inner weighted ends of clutches Z, which fit the rods X and are arranged when lifted in the manner presently understood to travel easily up on the rods X, but when depressed to clutch such rod and pull it back to its normal or horizontal position. It should be stated that the relative arrangement of the levers M and I the rock levers P' and the connections of the rods X links Y with such levers P' are such that, when the shaft with the levers is rocked it will serve to operate the lever M to elevate the frame K on the shaft O a distance three times that which the lever I operates to lift the shaft.

When the devices are capable of lifting eight feet to each story the top of the cage when its platform is flush with the floor joist will be at least eight feet from its supporting sheave. Now when it is desired to adjust the cages to stop in the same plane with the scaffold which we will assume is at a height of four feet from the floor the operator works the handle $P^2$ until the frames K reach such height, at which time through the rod X the lower lever I will have operated to raise the shafts with the cross head D and which movement serves to raise each cage two feet. Now by adding two feet to the distance, to the previous pull on the draft rope the lower cage will be lowered two feet, flush with the base frame and the upper cage elevated to a plane flush with the workmen's scaffold. After the platforms have been raised to the maximum height in the first story, the shaft supporting base frames are elevated and supported in a stirrup like support $A^5$ which is hung from the joists of the next floor, in a manner clearly shown in Fig. 13 which permits the cage platforms and the frames K to come flush with the upper edge of the joists. Additional cable sufficient to compensate for the increased travel for the cages is then unwound from both of the drums 10, and the operation of adjusting the cages and platforms and elevating is then continued as before.

To provide for a simple and effective manner for winding and unwinding the cables on the drums, I arrange them in a manner most clearly shown in Figs. 6 and 7, from which it will be seen that the drum 10 is loosely mounted for longitudinal movement on a rigid shaft 11, and such drum is held between hanger arms 12 12 on a yoke 13 supported by the rollers 14 14 on the upper member $r'$ of the frame R. 15 indicates a worm gear mounted in the yoke frame 13, which meshes with a worm wheel 16 on the drum 10 and which is provided with a suitable crank handle 17 as shown. By this construction when it is desired to wind up or unwind the cable on the drum the operator turns the handle 17, and as the pull is on the cable in a vertical plane, it the cable as it pulls off the drum causes it as it unwinds to travel sidewise on its supporting shaft, and in case it is desired to wind up the cable, the several coils as they gather on the drum will move it sidewise on the shaft and thereby provide for a uniform winding of the cable thereon.

While the worm and gear wheel will serve to hold the cage to its adjusted position, I provide the additional spring clamps shown at 20 20 which serve to automatically snap over a holding lug 21 on each car, as it reaches its upper limit, a suitably arranged trip lever 25 being provided by which the cage can be unlocked when it is to be lowered.

When using horse power to elevate the cages, I provide spring bumpers 30 which serve to take up the shock in case the cage travels up too quick and above its desired point of elevation. It is manifest however that when using steam as a motive power the holding springs and bumpers may be dispensed with. In using hoists of this character, it is some times desirable to apply the draft from the side or from the end of the building. To this end, I construct the pulleys U V V' as shown in Figs. 11 and 12 by reference to which it will be seen that the pulley U is held in a bracket $u$ which has a swinging bearing in an angle plate $u'$ on the frame A, it being held to its adjusted position by the pins $u^2$ $u^2$. When adjusted to the position shown in Fig. 1 the pulley U is arranged vertically from which the cable passes to the pulley V which is disposed in a horizontal position and is journaled in a bracket $v$ held on screw bearings $v'$. The opposite cable section is passed over the pulley V' swively mounted on the frame A from which when adjusted as shown in Fig. 1 the cable passes forward, when side draft is desired the pulleys V V' are arranged as shown in Fig. 12.

From the foregoing description taken in connection with the drawings the advantages and complete operation of my invention will be readily understood.

Having thus described my invention, what I claim, and desire to secure by Letters Patent, is—

1. A hoisting machine comprising a cage supporting frame, platform supporting frames, said frames arranged for independent vertical movement, and mechanism for simultaneously elevating such frames substantially as shown and described.

2. A hoisting machine comprising a vertically movable elevator frame formed of vertical shafts G and a cross head D, the elevator cable sheaves mounted on the said cross head, the alternately movable elevator cages supported on such sheaves, clutch devices for supporting and operating to elevate the said shafts, G, platform supporting frames adjustably mounted on the shafts G and the clutch mechanism for elevating and holding the said frames on the said shafts substantially as and for the purpose described.

3. In a hoisting machine the combination with a vertically movable elevator frame arranged to support the alternately operated cages and means for elevating such cages substantially as shown, of the vertically adjustable platform supporting frames, and mechanism substantially as described adapted to operate the elevator and the platform frames at the same time and to raise the platform frame to a greater degree than the elevator frame, whereby provision is made to adjust the cage elevating ropes to bring the cage floor and the platform in the same horizontal plane substantially as and for the purpose described.

4. In a hoisting machine the combination of the cage frames the counterbalanced cages supported thereon, the platform supporting frames K and mechanism for supporting the said frames and mechanism for simultaneously lifting them to varied degrees of movement substantially as shown and described.

5. In a machine for the purpose described a vertically movable cage supporting frame having vertical shafts G the frames $g^2$ for supporting such shafts, the platform frames K mounted to travel on the shafts G, the clutch devices carried by the frames K and the similar devices held by the frames $g^2$ and the intermediate lever mechanism connecting such clutch devices, whereby a single operating lever is adapted to elevate both the shafts G slower than the frames K all arranged substantially as and for the purpose described.

6. In a hoisting machine the combination with the vertical supports or shafts of the platform supporting frames K held to travel on such shafts and to be supported thereon, the clutch mechanism substantially as described carried by said frame and arranged to operate on the shafts G such mechanism having extended lever arms M, a rock shaft journaled on said frame, levers $P^2$ for rocking the shaft and connections between such levers and the arms M all arranged as and for the purpose described.

7. In a hoisting mechanism substantially as described, the combination with the vertical shafts G, the standards $g^2$, the clutch devices supported on the standards $g^2$ and adapted to operate to lift the shafts on their up movement and to travel loosely thereon when on their downward movement, of the frames K mounted on the shafts G for vertical movement, the clutch devices carried thereby movable on the shafts G on their upward movement and adapted to clutch and become fixed to the said shafts when forced downward, and means for operating both of such clutch devices, substantially as shown and described.

8. The combination with the shafts G the frames or standards $g^2$ the frames K, the clutch collars 6 $6^a$ held on the standards $g^2$, the clutch collars N, N, held on the frame K, such clutch devices having operating levers L and M respectively, of the angle levers P' the rods X having a frictional contact with the levers P' and connected at their lower end to the levers M the links $X^2$ and the clutches Z all arranged as shown and for the purpose described.

9. In a hoisting mechanism substantially as described, an elevator cage formed of an arched frame R and the floor supporting sections S said sections consisting of the angle frames T each having a floor portion and adapted to be detachably secured to the frames R substantially as and for the purpose described.

10. In a hoisting mechanism, substantially as shown the combination with the elevator cages R, the cable, and the snatch block W of the guide pulleys U V V' arranged as shown whereby they are adapted for adjustment substantially as and for the purpose described.

11. The combination with the cage frame R the side members r' of which have apertured lugs $r^3$ $r^4$ of the platform sections S, formed each of angular frames T the vertical members of which $t$ are extended at $t'$ and formed with hooked members $t^2$ and are adapted to be detachably held in said apertured lugs, substantially in the manner and for the purpose described.

JOHN E. ENNIS.

Witnesses:
FRED G. DIETERICH,
HARRY J. ROBINSON.